(12) United States Patent
Seifert et al.

(10) Patent No.: US 7,412,135 B2
(45) Date of Patent: Aug. 12, 2008

(54) FIBER OPTIC COUPLER, OPTICAL FIBER USEFUL WITH THE COUPLER AND/OR A PUMP LIGHT SOURCE, AND METHODS OF COUPLING LIGHT

(75) Inventors: Martin Seifert, West Simsbury, CT (US); Upendra H. Manyam, Weatogue, CT (US); Michael O'Connor, East Hartford, CT (US); Nils Jacobson, North Granby, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 11/338,144

(22) Filed: Jan. 23, 2006

(65) Prior Publication Data

US 2006/0251367 A1 Nov. 9, 2006

Related U.S. Application Data

(60) Provisional application No. 60/646,183, filed on Jan. 21, 2005.

(51) Int. Cl.
*G02B 6/26* (2006.01)
(52) U.S. Cl. .............................. 385/39; 385/50; 385/127
(58) Field of Classification Search .................. None
See application file for complete search history.

(56) References Cited

U.S. PATENT DOCUMENTS

| 4,315,666 A | | 2/1982 | Hicks, Jr. |
| 4,400,053 A | * | 8/1983 | Kazkaz ..................... 385/39 |
| 4,546,476 A | | 10/1985 | Shaw et al. |
| 4,723,828 A | | 2/1988 | Garel-Jones et al. |
| 4,755,037 A | | 7/1988 | Bjornlie et al. |
| 4,815,079 A | | 3/1989 | Snitzer et al. |
| 5,138,675 A | | 8/1992 | Schofield |
| 5,373,572 A | | 12/1994 | Arkwright et al. |
| 5,533,163 A | | 7/1996 | Muendel |
| 5,818,630 A | | 10/1998 | Fermann et al. |
| 5,864,644 A | | 1/1999 | DiGiovanni et al. |
| 5,864,645 A | | 1/1999 | Zellmer et al. |
| 5,873,923 A | | 2/1999 | DiGiovanni |
| 5,907,652 A | | 5/1999 | DiGiovanni et al. |
| 5,949,941 A | | 9/1999 | DiGiovanni |
| 5,966,491 A | | 10/1999 | DiGiovanni |
| 5,999,673 A | | 12/1999 | Valentin et al. |
| 6,154,589 A | * | 11/2000 | Kirk et al. ..................... 385/29 |

(Continued)

OTHER PUBLICATIONS

"Nufern Introduces PumpGuard(tm) Optical Fiber", article dated Jan. 28, 2005, www.photonicsonline.com.*

(Continued)

*Primary Examiner*—Sung Pak
*Assistant Examiner*—Mike Stahl
(74) *Attorney, Agent, or Firm*—Peter J. Rainville

(57) ABSTRACT

An optical fiber coupler can include at least a first input optical fiber and an output optical fiber, where the first input optical fiber can comprise an antiguiding core, a first cladding disposed about the antiguiding core and a second cladding disposed about the first cladding so as to tend to confine light to said first cladding. The output fiber can comprise a guiding core, a first cladding disposed about the guiding core and a second cladding disposed about the first cladding of the output fiber for tending to confine light to the first cladding of the output fiber. Optical fibers are also disclosed, as are methods.

20 Claims, 9 Drawing Sheets

U.S. PATENT DOCUMENTS

| | | |
|---|---|---|
| 6,356,680 B1 | 3/2002 | Kirk et al. |
| 6,434,295 B1 | 8/2002 | MacCormack et al. |
| 6,434,302 B1 | 8/2002 | Fidric et al. |
| 6,477,295 B1 | 11/2002 | Lang et al. |
| 6,477,307 B1 | 11/2002 | Tankala et al. |
| 6,496,301 B1 | 12/2002 | Koplow et al. |
| 6,625,363 B2 | 9/2003 | Carter et al. |
| 6,687,445 B2 | 2/2004 | Carter et al. |
| 6,826,335 B1 | 11/2004 | Grudinin et al. |
| 6,876,805 B2 | 4/2005 | Wang |
| 7,062,139 B2 * | 6/2006 | Shang ................. 385/124 |
| 2004/0196537 A1 | 10/2004 | Starodoumov |
| 2005/0094952 A1 | 5/2005 | Gonthièr et al. |
| 2005/0105866 A1 | 5/2005 | Grudinin et al. |

OTHER PUBLICATIONS

R.J. Beach et al.; "Phase-Locked Antiguided Multiple-Core Ribbon Fiber"; IEEE Photonics Tech. Lett. 15 (5), 2003, pp. 670-672, (May).

* cited by examiner

Single-mode Signal Transformation

Delivered multi-mode pump beam

------ PumpGuard      ——— Regular Pump Delivery Fiber

US 7,412,135 B2

FIBER OPTIC COUPLER, OPTICAL FIBER USEFUL WITH THE COUPLER AND/OR A PUMP LIGHT SOURCE, AND METHODS OF COUPLING LIGHT

CROSS-REFERENCE TO RELATED APPLICATION

This application claims priority to provisional patent application 60/646,183, filed Jan. 21, 2005 and entitled, "Fiber Optic Coupler, Optical Fiber Useful with the Coupler and/or a Pump Light Source, and Methods of Coupling Light", and which is herein incorporated by reference.

FIELD OF THE INVENTION

The present invention relates to optical waveguides, such as, for example, optical fibers, and apparatus including such waveguides, such as, for example, optical couplers, pigtailed pump light sources and lasers and amplifiers.

SUMMARY OF THE INVENTION

In one aspect, the invention provides an optical apparatus that can comprise an optical fiber coupler including at least a first input optical fiber and at least one output optical fiber. The first input optical fiber can comprise an antiguiding core, a first cladding disposed about the antiguiding core and a second cladding disposed about the first cladding so as to tend to confine light to the first cladding. The output fiber can comprise a guiding core, a first cladding disposed about the guiding core and a second cladding disposed about the first cladding of the output fiber for tending to confine light to the first cladding of the output fiber.

The optical apparatus can have a wavelength of operation, and a length of the output optical fiber can comprise a rare earth and can be configured to be substantially single mode at the wavelength of operation. The rare earth can provide light having the wavelength of operation responsive to receiving pump light. The length of fiber can normally support higher order modes at the wavelength of operation and the length being configured so as to be substantially single mode can include the length of fiber being bent such as, for example, by being arranged in a loop or loops having a selected radius, so as to attenuate higher order modes. The guiding core can comprise a diameter and the antiguiding core can comprise a diameter that is at least equal to the diameter of guiding core. The optical apparatus can comprise a light source in optical communication with the first input optical fiber. The at least a first input optical fiber can include a second input optical fiber that comprises a guiding core and a first cladding disposed about the guiding core. The output optical fiber can comprise at least one rare earth. The fiber apparatus can comprise a laser resonator. The fiber apparatus can comprise a fiber amplifier.

The optical fiber coupler can comprise one or more of a fiber bundle (e.g., a tapered fiber bundle), a splice, or an FSDM (see below). The first input optical fiber can be spliced to the output optical fiber. The first input optical fiber can support an $LP_{01}$ mode that includes an intensity profile having a central minima. The first input optical fiber can support a lowest order LP mode having a cross sectional intensity distribution that includes an annular region of higher light intensity surrounding a region of lower light intensity. The antiguiding core can comprise an index of refraction that is less than an index of refraction of the first cladding of the first input optical fiber. The index difference between said indices of refraction of said antiguiding core and said first cladding can be about 0.0006. Substantially throughout the antiguiding core any index of refraction of the antiguiding core can be less than an index of refraction of the first cladding of the first input optical fiber. The first cladding of the first input optical fiber can include an outer perimeter and at least a portion of the outer perimeter can be curved. In one practice of the invention the anti guiding core does not include a rare earth for providing light responsive to receiving pump light. The first input optical fiber can comprise a longitudinally extending aperture defined by the inner cladding of the first input optical fiber, where the antiguiding region comprises the aperture. The aperture can comprise air. The material of the first cladding of the output optical fiber can consist essentially of silica and the first cladding of the output optical fiber can comprise a numerical aperture relative to the second cladding of the output optical fiber of at least 0.2.

In another aspect, the invention provides an optical apparatus, comprising a cladding pumped optical fiber comprising an antiguiding core and a first cladding adjacent the antiguiding core. The first cladding can have an outer perimeter and can be for receiving pump light. The optical apparatus can include a second cladding disposed about the first cladding for tending to confine pump light to the first cladding. At least one of the following can apply: (a) at least a portion of the outer perimeter is curved, or (b) the antiguiding core does not include a rare earth for providing light responsive to absorbing the pump light. Both (a) and (b) can apply.

In one practice, at least a portion of the outer perimeter can be curved. In another practice, the antiguiding core does not include a rare earth for providing light responsive to absorbing the pump light. The first cladding can comprise a numerical aperture relative to the second cladding of at least 0.12, of at least 0.22, or of at least 0.25. The antiguiding core can comprise an index of refraction that is less than an index of refraction comprised by the first cladding. The material of first cladding of the first input optical fiber can consist essentially of silica.

The index difference between the indices of refraction of the antiguiding core and the first cladding can correspond to a calculated numerical aperture (not necessarily physically meaningful in sense of corresponding to a capture angle of light) of the first cladding relative to the antiguiding core of about 0.06. The index difference can be about 0.0006. The cladding pumped optical fiber can support a lowest order LP mode having a cross sectional intensity distribution that includes a continuous annular region of higher light intensity surrounding a center region of lower light intensity. The core can comprise a longitudinally extending aperture defined by the inner cladding, where the antiguiding region comprises the aperture. The aperture can comprise air. The optical apparatus can comprise a pump light source in optical communication with the cladding pumped optical fiber. The pump light source can include an optical fiber pigtail, where the optical fiber pigtail comprises the cladding pumped optical fiber.

In yet an additional aspect, the invention provides an optical fiber comprising first, second and third regions. The third region can be disposed about the second region and the second region can be disposed about the first region. The first region can have an outer perimeter and can comprise all the area within the outer perimeter. The outer perimeter can have a diameter of at least 75 microns, and the second region can be for receiving pump light for optically pumping an active material. The material of the second region can consist essentially of silica. The second region can have a numerical aperture with respect to the third region of at least 0.12, of at least 0.22, or at least 0.25, and can support multiple modes. The first region can have substantially throughout an index of refraction that is less than an index of refraction of the second region. The fiber can include a region, such as the third region, disposed about the second region. The region can have an outer perimeter having a geometrical center, and the geometrical center can be within the outer perimeter of the first region.

In yet a further aspect, the invention provides a method of transporting light from a pump light source for facilitating absorption of the light by an active material. The method can include providing a pump light source for providing pump light; and providing an optical fiber in optical communication with the pump light source, where the optical fiber has a multimode cladding for propagating the pump light, the multimode cladding being disposed about and adjacent to an antiguiding core, the multimode cladding having an outer perimeter, wherein (a) at least a portion of the outer perimeter is curved, or (b) the antiguiding core does not include a rare earth for providing light responsive to absorbing the pump light, or both (a) and (b). Providing the pump light source can include providing a single emitter laser diode. The method can include providing a second optical fiber having a guiding core, a pump cladding disposed about the guiding core and a second cladding disposed about the pump cladding, where the second optical fiber is in optical communication with the optical fiber such that the pump cladding receives pump light. The antiguiding region can comprise an index of refraction that is less than an index of refraction of the multimode cladding.

The term "light" as used herein, is not to be limited to wavelengths visible to the human eye, which is a definition that can be found in certain dictionaries intended for laypersons. "Antiguiding core", as that term is used herein, means that light launched into the antiguiding core tends to be excluded from the antiguiding core, as, for example, can be determined by launching light having a substantially Gaussian distribution (e.g., light from a conventional single mode fiber) into one end of the fiber and comparing the Gaussian distribution to a measurement of the output intensity distribution in the far field of the light emanating from the other end of the fiber. The substantially Gaussian light should be launched "on axis" (substantially along and symmetric with respect to the longitudinal axis of the fiber) and the fiber under test should have a length of a meter or more.

Not every component is labeled in every one of the foregoing FIGURES, nor is every component of each embodiment of the invention shown where illustration is not considered necessary to allow those of ordinary skill in the art to understand the invention. The FIGURES are schematic and not necessarily to scale.

When considered in conjunction with the foregoing FIGURES, further features of the invention will become apparent from the following detailed description of non-limiting embodiments of the invention.

DETAILED DESCRIPTION

Figure 1:
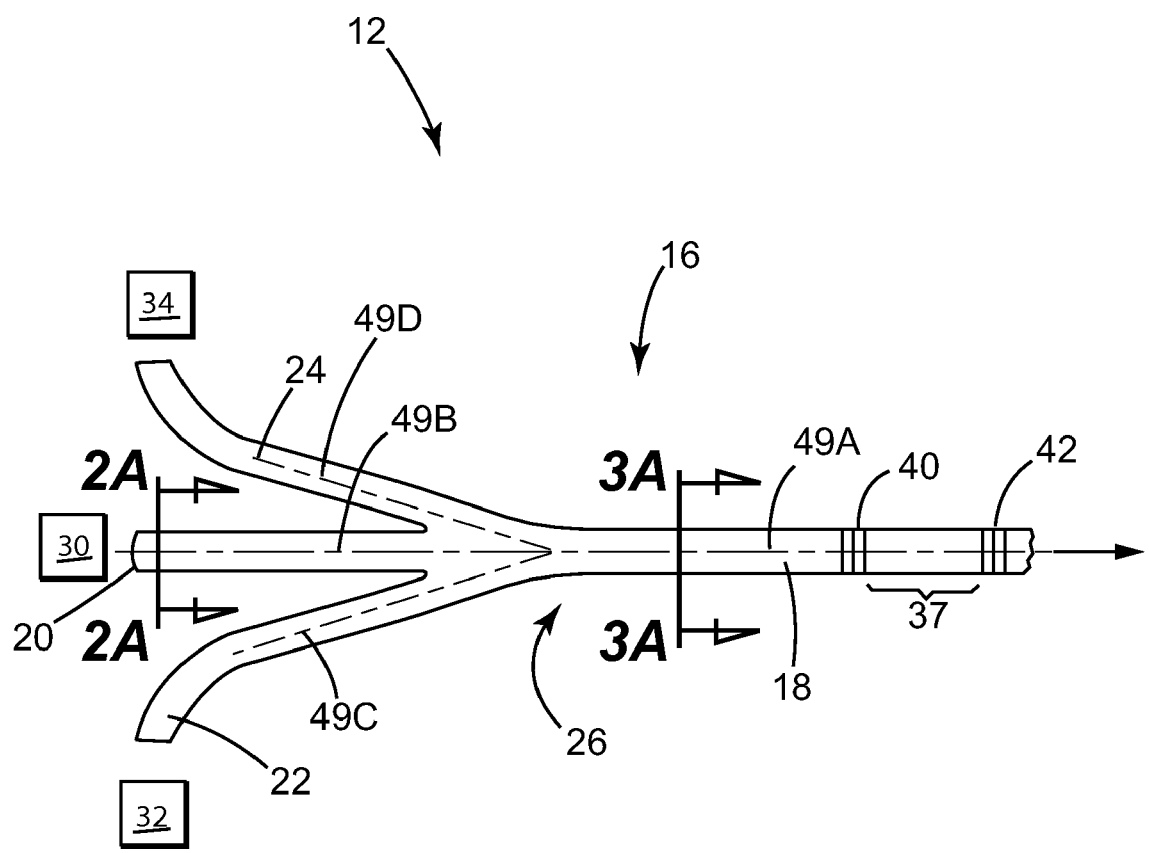
FIG. 1 schematically illustrates one embodiment of an optical apparatus according to the invention.

FIG. 1 schematically illustrates one embodiment of an optical apparatus 12 according to the invention. The optical apparatus 12 includes an optical fiber coupler 16 that includes at least one output optical fiber 18 and at least a first input optical fiber 20. The embodiment shown in FIG. 1 shows additional input optical fibers, such as, for example, input optical fibers 22 and 24, respectively. The coupling region 26 can provide optical communication between the input optical fiber(s) and the output optical fiber 18. The optical apparatus 12 can include one or more light sources, such as light sources 30, 32 and 34. Each of the light sources 30, 32 and 34 can be in optical communication with a different one of the input optical fibers 20, 22 and 24, as shown in FIG. 1. The coupling region 26 can combine light from the light sources 30, 32, and 34 for provision to the output optical fiber 18. One or more of the light sources 30, 32 and 34 can comprise a semiconductor light source, such as, for example, a light emitting diode (LED) or a laser diode. One or more of the semiconductor light sources can be a single-emitter semiconductor light source. One or more of the semiconductor light sources can comprise a diode bar.

The optical fiber coupler 16 can be a fused fiber coupler. The coupling region 26, such as shown in the embodiment of FIG. 1, can comprise a fiber bundle, which can be a tapered fiber bundle. One way to form a tapered fiber bundle is to heat fibers and pull them to a reduced diameter. U.S. Pat. No. 5,864,644, issued on Jan. 26, 1999 to DiGiovanni et al., and entitled "Tapered Fiber Bundles For Coupling Light Into And Out Of Cladding-Pumped Fiber Devices", teaches one example of an optical coupler that includes a tapered fiber bundle. Several different types of coupling regions 26 are known in the art and are suitable for use with the present invention. In certain embodiments, such as wherein the optical fiber coupler 16 includes a single input fiber (e.g., the input fiber 20) and a single output optical fiber (e.g., the output fiber 18), the coupling region 26 can comprise an optical fiber splice. By way of example and not limitation, other known coupling regions can include a tapered fiber fused to another fiber, as taught, for example, in U.S. Pat. No. 5,999,673, issued to Valentin et al. on Dec. 7, 1999 and entitled "Coupling Arrangement Between A Multi-Mode Light Source And An Optical Fiber Through An Intermediate Optical Fiber Length", and the "Fiber Space Division Multiplexor" (FSDM), as taught in U.S. Pat. No. 6,477,295, issued to Lang et al. on Nov. 5, 2002, and entitled "Pump Coupling Of Double Clad Fibers".

One or more of the light sources 30, 32, and 34 can provide pump light for pumping an active material, such as a rare earth. For example, at least a section 37 of the output optical fiber 18 can include an active material, such as, for example, a rare earth (such as, for example, ytterbium, erbium, both ytterbium and erbium, neodymium or thulium). The active material, responsive to being pumped by pump light having a first wavelength, can provide light having a second wavelength that is different than the first wavelength. The output optical fiber 18 can include at least one reflector for forming at least part of a laser resonator for providing laser light including the second wavelength. The embodiment of the invention shown in FIG. 1 includes the spaced reflectors 40 and 42. At least one of the reflectors 40 and 42 can be a fiber Bragg grating (FBG). One or both of the reflectors, such as, for example, the reflector 42, can be a fiber cleave or a mirror formed on the end of the output fiber 18 rather than a FBG. It is also known in the art for a laser resonator to be formed using a single reflector, such as a FBG that includes an appropriate phase shift between sections of the grating. Distributed Feedback (DFB) and Distributed Back Reflection (DBR) designs for fiber lasers are known in the art.

In certain practices of the invention, the optical apparatus 12 can amplify input light having the second wavelength. One of the light sources 30, 32 or 34 can provide seed light having the second wavelength and can comprise, for example, an optical fiber that is spliced to one of the input fibers 20, 22 or 24 for providing optical communication. Another of the light sources can provide pump light for optically pumping an active material that amplifies the seed light. An optical amplifier can, but often does not, include one or more reflectors, such as one or more of the reflectors 40 and 42.

In a preferred embodiment of the invention, at least one of the input optical fibers, such as the first input optical fiber 20, comprises an antiguiding core. The output optical fiber 18 can include a guiding core. Without wishing to be bound by theory, it is considered that such an optical apparatus 12 of the present invention can help protect one or more of the light sources 30, 32 and 34 from damage that can lead to destruction of the light source. Such damage can arise from light propagating along one or more of the input fibers 20, 22 and 24 in a direction toward a light source. This light is referred to herein as "back propagating light". As one example, it is known for light (such as pulses of high intensity light when, for example, a fiber laser spontaneously Q-switches) to suddenly propagate from the output optical fiber 18, through the coupling region 26 to one or more of the input fibers and ultimately to one of more of the light sources 30, 32 and 34. This can be detrimental, particularly when the one of the light sources is a semiconductor light source, such as a semiconductor light source having a single emitter, and can damage or destroy the light source. Such back reflected light is often generated as single mode light by a fiber laser and hence can have high brightness.

Light sources can be susceptible to such damage because they are often being driven quite hard. Typically it is desirable that an optical apparatus, such as an optical fiber laser or amplifier, have as high an optical power output as possible. Achieving a high power output from a particular design typically includes having the pump light source provide as high a power level of pump light as possible. This can mean driving a pump light source, such as laser diode or LED, to near catastrophic output power levels. Diode manufacturers have employed improved epitaxy methods and mounted diodes P-side down onto a heat sink to allow diodes to survive providing higher output powers of light. However, most diodes include an active stripe and an emitting facet for emitting the light that is delivered to an input fiber, such as the first input fiber 20 of the optical fiber coupler 16. Diodes often fail when the emitting facet overheats and is destroyed. Those of ordinary skill in the art refer to such a failure as "catastrophic optical damage" or COD. The back propagating light can impinge on the facet as a rather intense spot and facilitate COD.

Applicants have verified that the back reflected light can have a small mode field diameter (MFD) so as to return to the facet as a rather intense spot, even though the back propagating light is typically propagating, after passing from the output optical fiber to the input fiber, in a multimode region of the input fiber, and the multimode region has a large diameter (e.g., greater than or equal to 75 microns, and more typically greater than or equal to 100 microns) that typically propagates light (e.g., the light received from the pump light source) so as to have a much larger MFD. The relatively short length of the typical input fiber may be responsible, at least in part, for the small MFD of the back propagating light. The MFD of the back propagating light can have a MFD commensurate with a single mode beam propagating in, for example, the output optical fiber 18, which is often operated substantially single mode. For example, the backward propagating light can have a mode field diameter (MFD) of 10 microns, or of 20 microns, or of 30 microns or larger. This intense spot of light can unexpectedly optically and/or thermally load a small portion of the facet, initiating COD. In many instances the light source can be one of the more expensive components of an optical fiber apparatus, such as an optical fiber laser or amplifier.

Applicants consider that an input fiber 20 having an antiguiding core can reduce the intensity of the back propagating light such that the light source is less likely to be damaged. The antiguiding core will have no significant detrimental effect on the light received from the light source and that is forward propagated toward the coupling region 26 for delivery to the output fiber 18.

Note that the output fiber 18 has a longitudinal axis 49A, and that each of the input fibers 20, 22 and 24 has a longitudinal axis 49B, 49C and 49D, respectively. The longitudinal axis 49B of the first input fiber 20 is the most nearly aligned with the longitudinal axis 49A of output fiber 18, and the longitudinal axis 49B can be nearly collinear with the longitudinal axis 49A, as shown in FIG. 1. Applicants have found that input fibers that are more nearly aligned with an output fiber typically receive higher power levels of back propagating energy. At least those input fibers that are nearly aligned with the output fiber should include provision for reducing the intensity of back reflected light, as taught herein. Note that the terms "input" and "output" are used herein for convenience (in the sense of "first" and "second", which are avoided in the description of the fibers as "first" and "second" are used extensively to distinguish claddings), and are not meant to imply a limitation wherein light can only be intentionally provided to an "input" fiber or extracted from an "output" fiber.

In certain practices of the invention the second input optical fiber 22 can be substantially identical to the first input optical fiber 20, except that the second input optical fiber does not include the antiguiding core of the first input optical fiber, which is simply replaced by additional material of the first cladding. In this instance, the first cladding acts as a guiding core for light received from the light source 32 (as is true for the first input optical fiber as well).

Figure 2A:
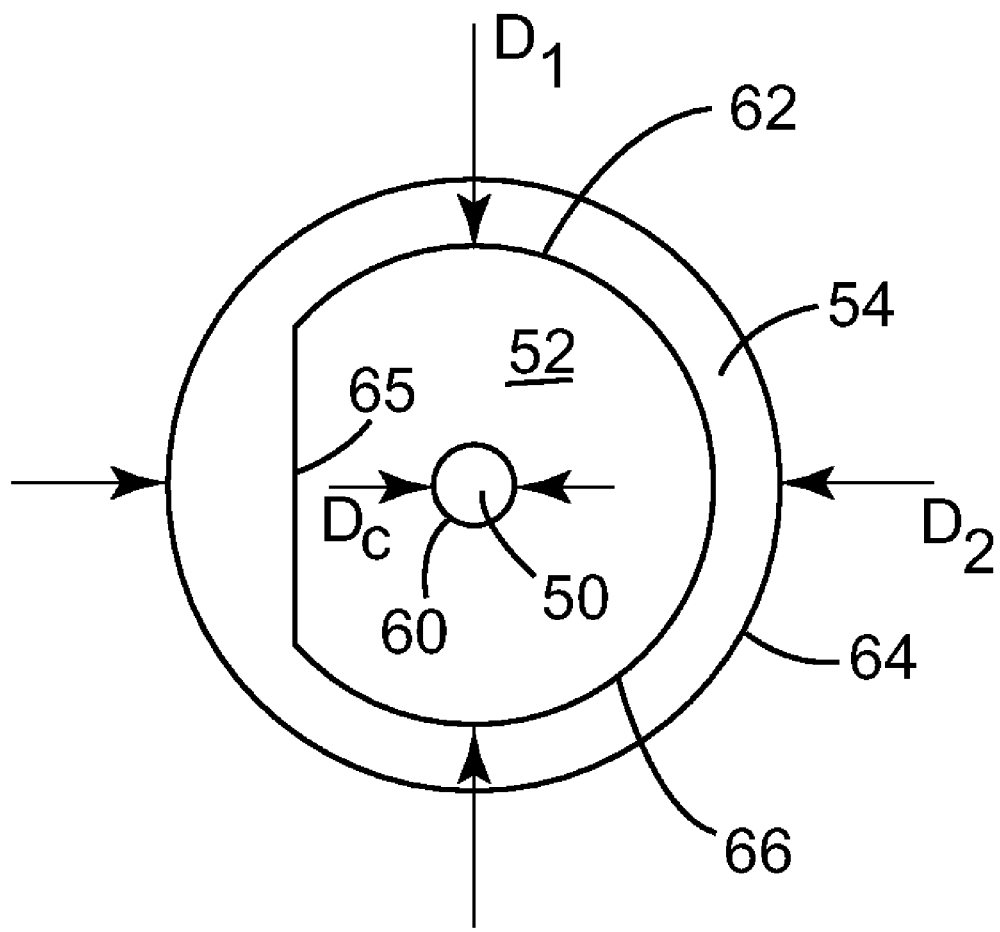
FIG. 2A illustrates an exemplary cross section, along section line 2A-2A, of an input optical fiber of the optical apparatus of FIG. 1.

FIG. 2A illustrates an exemplary cross section, taken along section line 2A-2A of FIG. 1, of the first input optical fiber 20 of the optical apparatus of FIG. 1. With reference to FIG. 2A, the first input optical fiber 20 can include an antiguiding core 50, a first cladding 52 disposed about the core 50, and a second cladding 54 disposed about the first cladding 52 for tending to confine light, such as, for example, pump light, to the first cladding 52, which can act as a "core" for the pump light. Typically the first cladding 52 receives pump light from a light source, such as the light source 30. The antiguiding core 50 can have an outer perimeter 60, the first cladding can have an outer perimeter 62, and the second cladding can have an outer perimeter 64. As shown in FIG. 2A, the antiguiding core 50 can include all of the area within the outer perimeter 60. One or more of the outer perimeters 60, 62 and 64 can have a non-circular shape. For example, the outer perimeter 62 of the first cladding can have a noncircular shape, such as by including the straight section 65, for tending to scatter or mix modes of the first cladding and hence helping to reduce the power density of any back propagating light. The outer perimeter 62 can include the curved portion 66. The antiguiding core 50 can tend to cause the first input fiber 20 to decrease the intensity of the back propagating light as compared to an input fiber that did not include the antiguiding core 50. Also, the back propagating light can in some instances be more readily acted upon by the non-circular outer perimeter of the pump cladding 62. Other non-circular shapes are possible for an outer perimeter, such as, for example, a polygon, such as an octagon, or a star shape. A curved portion of the outer perimeter 62 can comprise a convex shape or a concave shape. Stating that one region is "disposed about" another region means that the one region, surrounds, at least partially, the other region and may additionally contact the other region, if, for example, there are intermediate regions interposed between the one region and the other region. Typically, the first cladding surrounds and contacts the core and the second cladding surrounds and contacts the first cladding.

It is understood that the process of forming an optical fiber can make forming exact geometrical shapes more or less difficult, depending on processing parameters. Designation of a shape herein means the shape as one of ordinary skill would understand it. For example, "octagon", as used herein, can include an octagon with rounded corners. One of ordinary skill in the art readily understands shapes often change somewhat during the various processing steps that can be involved in making an optical fiber article. For example, corners of a shaped preform can tend to round upon drawing of the fiber. Exact geometrical shapes can be as much the exception as the rule in the optical fiber art.

In various embodiments of the invention the first cladding 52 can have a diameter $D_1$ of greater than 75 microns; greater than 100 microns; greater than 200 microns; and greater than 300 microns. In certain embodiments of the invention the first cladding 52 has diameter $D_1$ of about 100 microns and the second cladding 54 has a diameter $D_2$ of about 125 microns. In another embodiment of the invention the first cladding 52 has diameter $D_1$ of about 400 microns and the second cladding 54 has a diameter $D_2$ of about 480 microns. In yet a further embodiment of the invention, the first cladding has a diameter $D_1$ of about 200 microns and the second cladding has a diameter $D_2$ of about 220 microns. In certain embodiments of the invention, the antiguiding core 50 has a diameter $D_c$ of about 10 microns, of about 15 microns, about 20 microns, and about 25 microns. Typically the antiguiding core 50 does not include a rare earth for providing light responsive to absorbing pump light. All combinations of the foregoing diameters for an antiguiding core 50, first cladding 52 and second cladding 54 are within the scope of the invention.

Figure 2B:
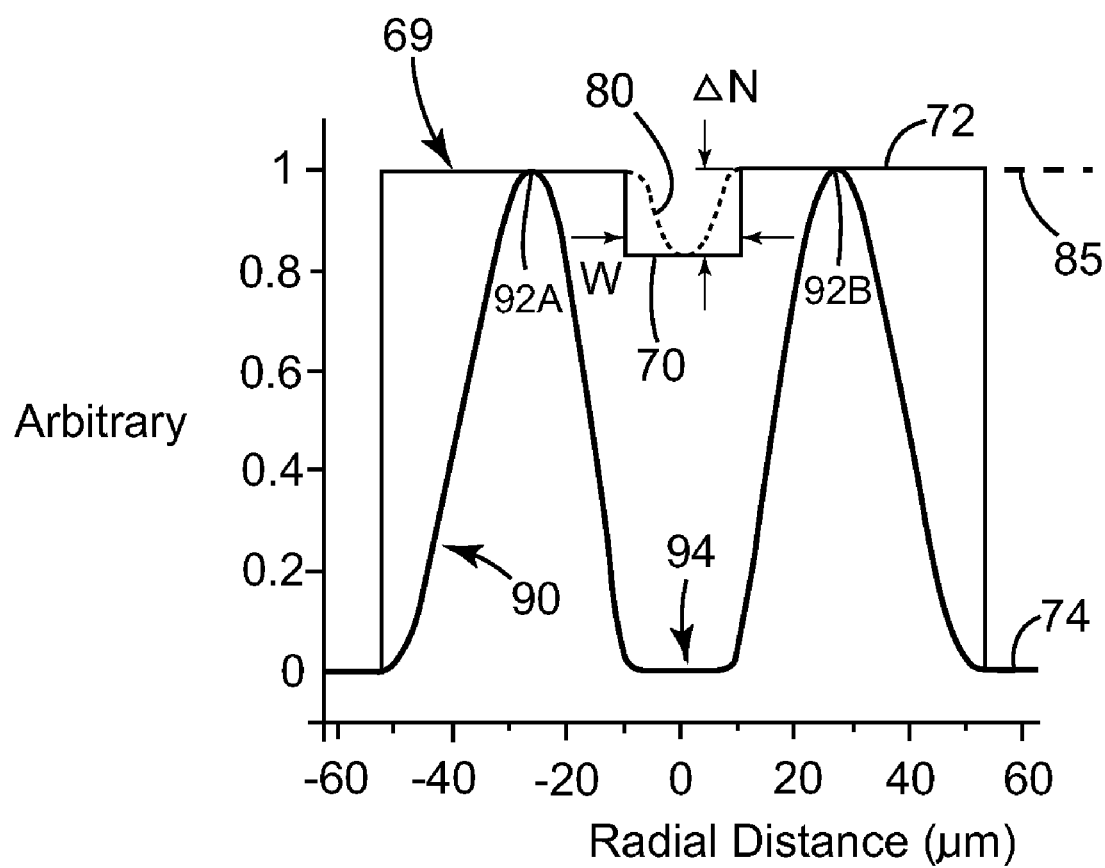
FIG. 2B illustrates a profile of a intensity distribution, for the LP01 mode, modeled based on the illustrated exemplary index of refraction profile, where the index of refraction profile corresponds generally to the cross section of FIG. 2A.

FIG. 2B illustrates one example of an idealized index of refraction profile 69 corresponding to the cross section of the input optical fiber 20 shown in FIG. 2A. The section 70 of the index of refraction profile 69 can correspond to the antiguiding core 50; the section 72 can correspond to the first cladding 52; and the section 74 can correspond to the second cladding 54. The antiguiding core 50 can include an index of refraction that is less than an index of refraction of the first cladding 52, and the second cladding can include an index of refraction that is less than an index of refraction of the first cladding 52. Note the index of refraction profile is idealized, and artifacts due to a particular manufacturing process, such as the "index dip" or index "spike" sometimes found when a fiber is fabricated using techniques such as modified chemical vapor deposition (MCVD) or outside vapor deposition (OVD) are not shown.

Although the index of refraction profile 69 show indices of refraction substantially constant over the sections corresponding to each of the regions (e.g., the core, first cladding and second cladding), one of ordinary skill in the art understands that the index of refraction can vary in a region, and the invention can include index of refraction profiles wherein the index of refraction varies over a section corresponding to a region, and the region has more than one index of refraction. For example, the antiguiding core can include a "reverse" graded index profile, as indicated by the dotted line 80 of FIG. 2B, wherein the index of refraction decreases inwardly. Note also that an antiguiding core can have a ring or annular shape, wherein, for example, the antiguiding core 50 can include, in addition to the outer perimeter 60, an inner perimeter such that the antiguiding core comprises the area between the inner and outer perimeters. A fiber can include more than one antiguiding core, and can include, for example the antiguiding core 50 of FIG. 2A and a ring shaped antiguiding core disposed about and spaced from the antiguiding core 50. The terms "ring shaped" or "annular" are used generally herein—such a core need not have a uniform thickness around the ring, meaning that the inner and outer perimeters of the ring need not be concentric circles.

Figure 2C:
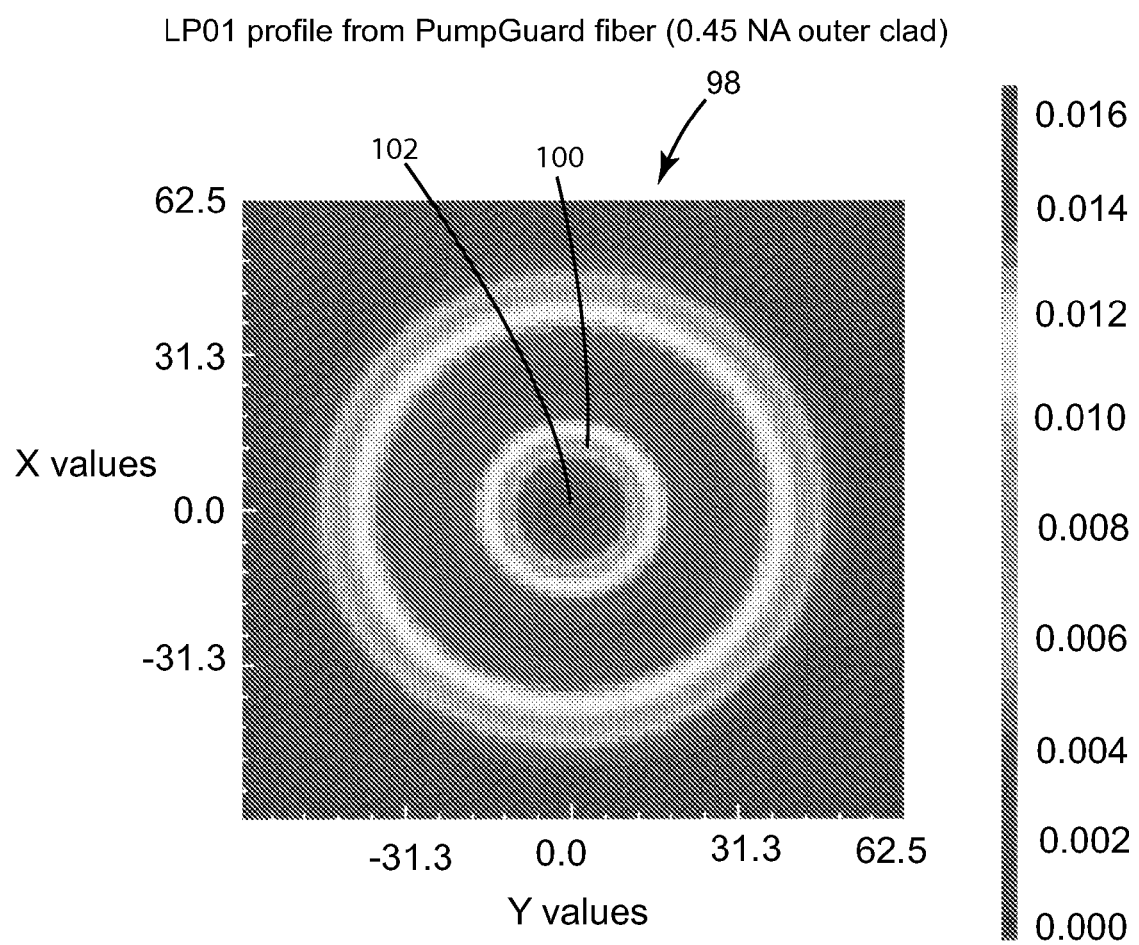
FIG. 2C shows a cross section of the intensity distribution shown in profile in FIG. 2B.
Figure 2D:
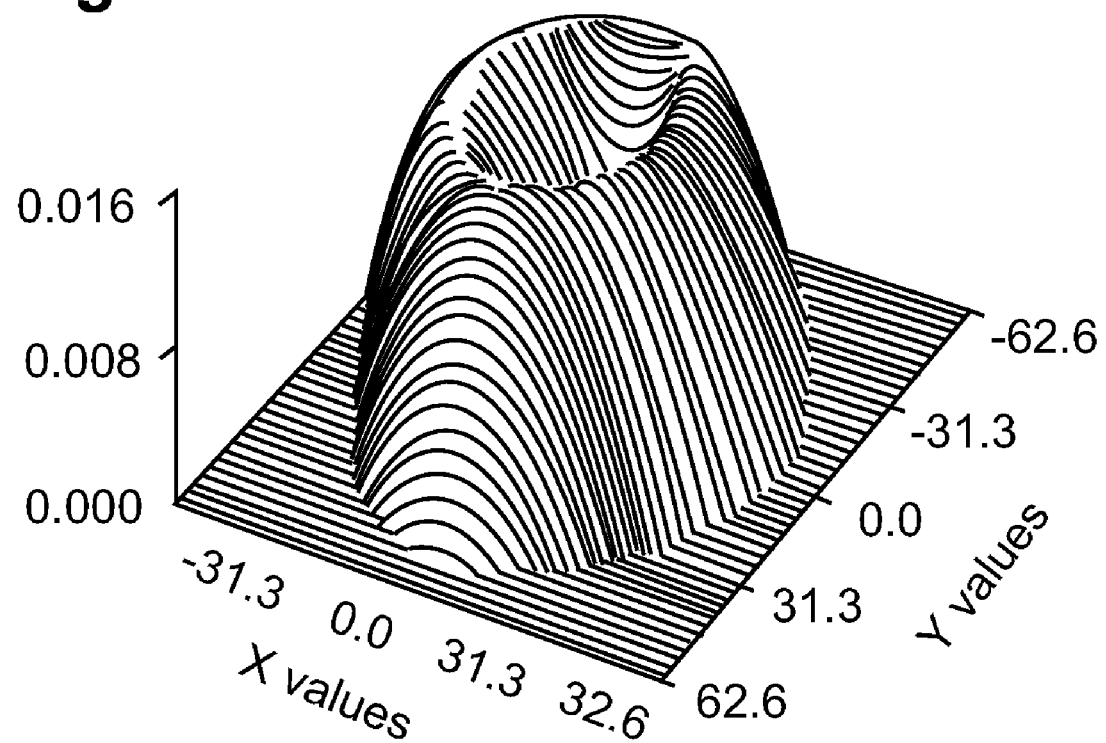
FIG. 2D illustrates a representation of the three dimensional intensity distribution shown in profile in FIG. 2B and in cross section in FIG. 2C.

FIG. 2B also illustrates an intensity profile 90 of the modeled intensity distribution for the fundamental mode, which in this instance is the LP01 mode, for a fiber having the refractive index profile 69. For the model, the width W of the section 70, and hence a diameter $D_c$ of the antiguiding core 50, is 20 microns and the index of refraction difference $\Delta N$ between the section 72 and the section can be 0.0006, for example. The model assumes a circular outer perimeter 62, or at least does not take into account any effect of the straight section 65. Note that the intensity profile 90 includes a pair of maxima, 92A and 92B, and a central minima 94 located adjacent and between the maxima 92A and 92B, where the central minima 94 corresponds generally to the section 70 of the index of refraction profile 69. "Minima" and "maxima", as used herein, can include, respectively, local minima and maxima. FIG. 2C shows a cross section 98 of the modeled intensity distribution, where dark regions indicate lower intensity and lighter regions indicate higher intensity. The cross section 98 includes a continuous annular region 100 of higher intensity surrounding an adjacent and central region 102 of lower intensity. FIG. 2D is a representation of a three dimensional view of the modeled intensity distribution from which the intensity profile of FIG. 2B and the intensity cross-section of FIG. 2C are derived.

Figure 2E:
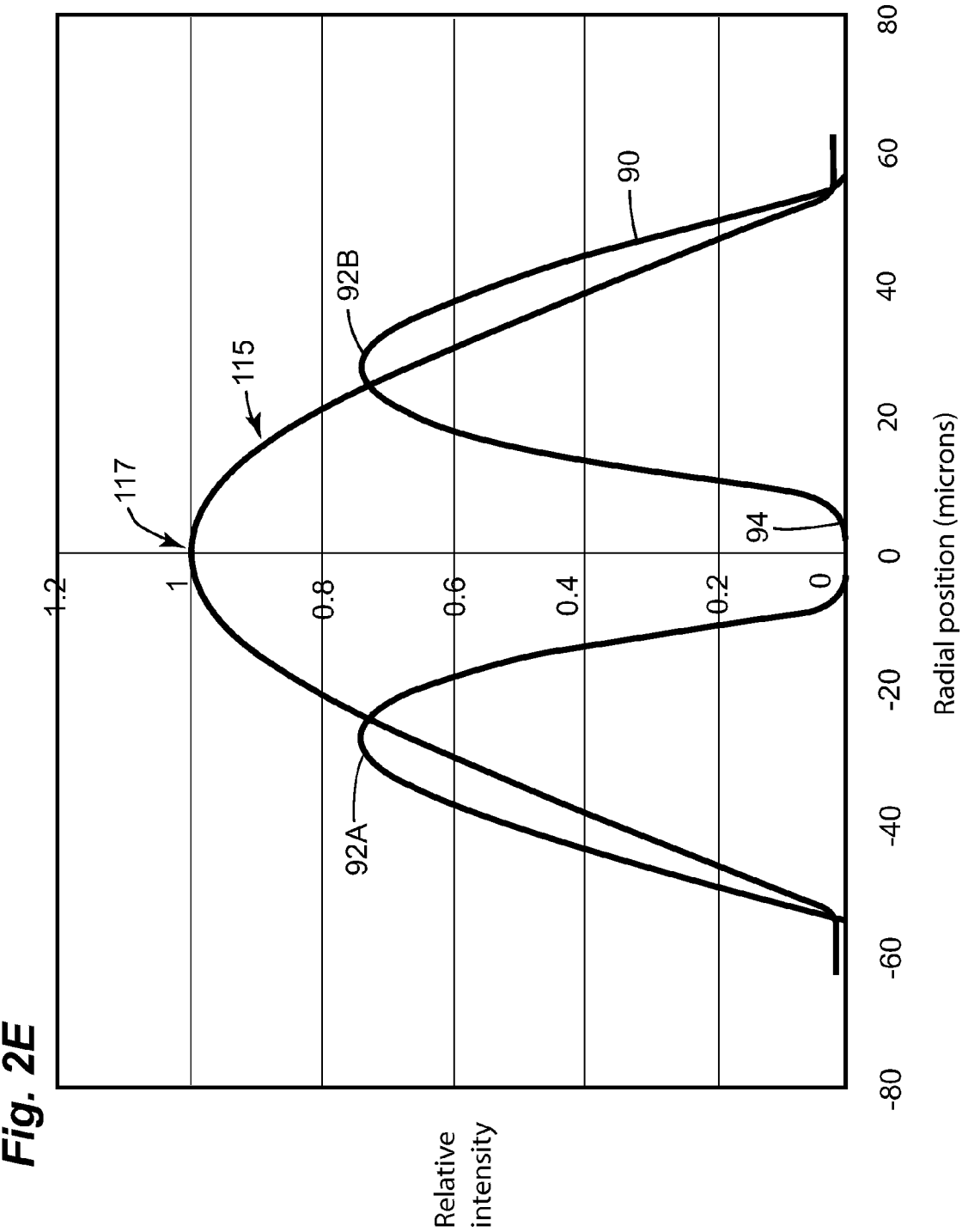
FIG. 2E compares the intensity profile shown in FIG. 2B with a modeled intensity profile for the LP01 mode of a similar fiber that does not include an antiguiding core.

FIG. 2E compares the intensity profile 90 shown in FIG. 2B with the intensity profile 115 for the fundamental mode (LP01) of a similar fiber that does not include an antiguiding core. Note that the maximum intensity 117 of the intensity profile 115 is substantially higher than either of the maxima 92A and 92B of the intensity profile 90. One or both of the maxima 92A and 92B are at least less than 80% of the maximum 117. Note the high intensity back reflected light observed in an input fiber lacking an antiguiding core can have a mode field diameter (mode field diameter, or MFD, as used herein refers to the $1/e^2$ diameter known to those of ordinary skill in the art) that is less than the MFD for intensity profile 115. The received back reflected light can have originated, such as from the output fiber, as single mode or near single mode light, where "near single mode" or "substantially single mode" means that the light could provide an $M^2$ parameter of no greater than five (5). By way of example and not limitation, this can be the case if (A) the output fiber normally supports only a single mode or (B) the output fiber is normally multimode but due to its configuration the optical power distribution amongst the modes is such that the fiber can provide an output beam having the $M^2$ parameter of no greater than 5. (B) can occur when the fiber is normally multimode but is bent, such as by being coiled to a selected radius, to attenuate higher order modes, adopting techniques taught in U.S. Pat. No. 6,496,301. Preferably at least a majority of the MFD of the back reflected light is launched into the antiguiding core 50, which tends to exclude the light from the antiguiding core 50, such as, for example, by having an index of refraction that is lower than an index of refraction of the first cladding 52. Light can be shifted from the antiguiding core 50 such that the cross sectional area of the light beam is increased, which can lead to the intensity being decreased so as to be less likely to cause the COD described above. With reference to FIG. 2A, preferably the outer perimeter 60 of the antiguiding core 50 has a diameter $D_c$ that is no less than the MFD of the back reflected light initially launched into the input fiber, which MFD is determined, at least in part, by the output fiber 18. It can be advantageous that the diameter $D_c$ be no less than a diameter of the guiding core included by the output optical fiber 18.

Note that an optical fiber preform for drawing a fiber having the antiguiding core 50 and the first cladding 52 can be formed, at least in part, by depositing material having a first index of refraction on the inside of a tube that has a higher index of refraction. For example, fluorine-doped silica or boron-doped silica can be deposited, via MCVD, on the inside of a tube that consists essentially of silica. Fluorine doped silica has an index of refraction that is lower than the index of refraction of silica and hence forms at least part of the antiguiding core 50 and the silica tube can form at least part of the first cladding 52. A heavily fluorinated tube can be disposed over the silica tube, such as by an overcollapse procedure, and can form at least a part of the second cladding 54. The second cladding can also be added during draw as a low index polymer coating, in which case the heavily fluorinated tube may not be necessary. Care should be taken to avoid excessive burnout of dopant (e.g., fluorine) from the antiguiding core region during collapse of the silica tube, as this can result not in the typical index dip that is often an artifact of the MCVD process, but rather in an index spike, which can tend to guide light and may, in certain circumstances, lessen the desirable reduction in the intensity of the back reflected light.

It should be noted that one of ordinary skill understands that different nomenclatures are possible for regions of a fiber. As used herein "cladding" means "region", and does not require that the cladding acts to tend to confine light to a region about which the cladding is disposed (as is evident from the description of the input fiber 20, wherein the first cladding is disposed about an antiguiding core). Claddings, can, of course, be disposed about a region so as to tend to confine light to the region. Such a cladding is typically disposed about a guiding region. In this instance the cladding is typically adjacent the region and has an effective index of refraction that is less than that of the region. By way of example and not limitation, such claddings can consist essentially of one material (e.g., silica) or be otherwise homogenous, can have dopant concentrations or indices of refraction that vary within the cladding, or can include longitudinally extending features (e.g., apertures) that are considered to provide an average index of refraction (see U.S. Pat. No. 5,907,652) or that provide a photonic bandgap that excludes light from the cladding. In the case of the '652 patent, the features can act to reduce effective index of refraction of the cladding that includes the features via a "weighted average" phenomenon. That is, the effective refractive index of a region can be considered to be functionally related to the volume fraction of each the constituents (e.g., the features and any other material(s) of the second cladding) and the refractive index of each constituent. See, for example, the mathematical relationship provided at column 2, lines 46-49, of the aforementioned '652 patent. The photonic bandgap is usually considered to be somewhat different than the weighted average approach, and has been the subject of considerable inventive activity. Claddings can include features, such as longitudinally extending stress inducing regions, which are provided for reasons other than tending to confine light to a region about which the cladding is disposed, such as for providing birefringence or for scrambling higher order modes.

Figure 3A:
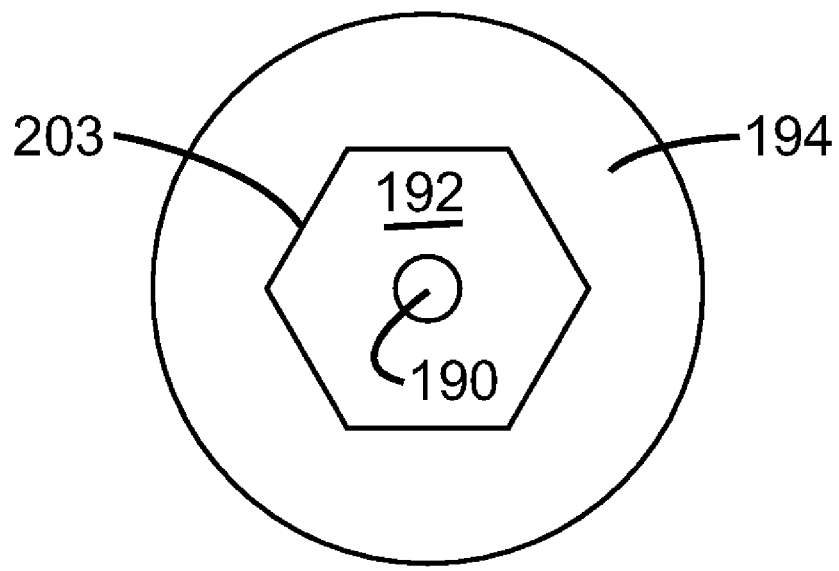
FIG. 3A illustrates an exemplary cross section, taken along section line 3A-3A, of the output optical fiber of the optical apparatus of FIG. 1.

FIG. 3A illustrates an exemplary cross section, taken along section line 3A-3A of FIG. 1, of the output optical fiber 18 of the apparatus of FIG. 1. The output optical fiber 18 can include a guiding core 190, an inner (or first) cladding 192 disposed about the guiding core 190, and an outer (or second) cladding 194 disposed about the inner cladding 192. The outer perimeter 203 of the inner cladding can have a non-circular shape, such as, for example, the hexagon shape shown in FIG. 3A, for scattering pump light (e.g., interrupting the aforementioned helical modes) to enhance intersection of the pump light with the active material, which is typically included mainly in or near the core 190. A variety of non-circular shapes known in the art for the perimeter of a cladding, such as the perimeter 203 of the inner cladding 192. By way of example and not limitation, such known shapes include a "D" shape; a "star" shape, a rectangular shape; a square shape; and regular and irregular polygon shapes, such as, for example, hexagon and octagon shapes.

Figure 3B:
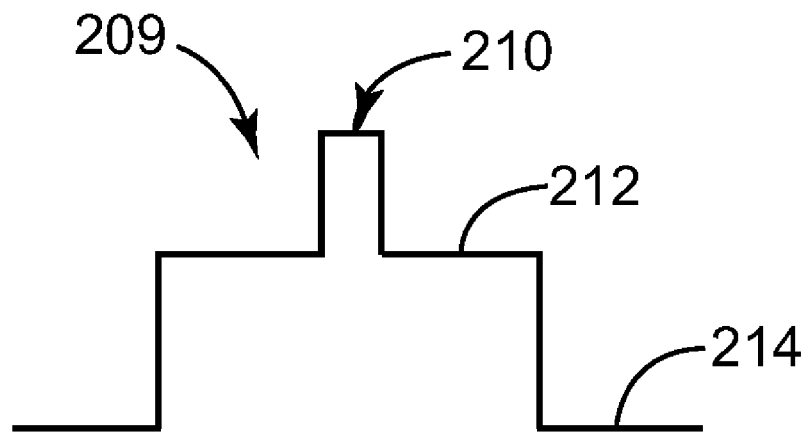
FIG. 3B illustrates an exemplary index of refraction profile corresponding to the cross section shown in FIG. 3A.

FIG. 3B illustrates an exemplary and idealized index of refraction profile 209 corresponding to the cross section of the output optical fiber 18 shown in FIG. 3A. The section 210 of the index of refraction profile 209 can correspond to the guiding core 190; the section 212 can correspond to the inner cladding 192; and the section 214 can correspond to the outer cladding 194. The guiding core 190 can include an index of refraction that is greater than an index of refraction of the inner cladding 192, and the outer cladding 194 can include an index of refraction that is less than an index of refraction of the inner cladding 192. As noted above, the index of refraction profile 209 is exemplary, and the index of refraction need not be constant over a profile of a region of an optical fiber according to the invention.

The invention is understood to be particularly useful when the output fiber 18 propagates substantially a single mode at a wavelength of operation of the optical apparatus (e.g., a wavelength at which an active material, such as a rare earth, provides light responsive to receiving pump light). Note that this does not mean that the output fiber 18 must inherently be substantially single mode fiber at the wavelength of operation (where "inherently" refers to the behavior of the fiber when substantially all of the cross sectional area of the core is illuminated and the fiber is oriented so as to be substantially straight). Under the foregoing conditions regarding orientation and launch, the fiber may be multimode. However, a fiber that is not inherently substantially single mode may be configured such that it operates substantially single mode. See, for example, U.S. Pat. No. 6,496,301, issued on Dec. 17, 2002 to Koplow, Kliner and Goldberg. The '301 patent involves coiling a multimode fiber to filter out, via bend loss, selected higher order modes. The selected higher order modes experience substantially higher bend loss than the non-selected (lower order) modes. Such a technique allows higher power operation of the fiber while maintaining the quality of the light provided by the fiber. U.S. Pat. No. 5,818,630, issued Oct. 6, 1998 to Fermann et al. and entitled "Single-Mode Amplifiers And Compressors Based On Multi-Mode Fibers", teaches another configuring technique that can allow substantially single mode operation by, among other features (using short lengths and minimizing perturbations), matching the modal profile of the fundamental mode of the multimode fiber at the launch end of the fiber with a diffraction limited optical mode. Of course an inherently (also referred to herein as "normally") single mode fiber is also configured, as the term "configured" is used herein, for substantially single-mode operation.

Fibers having lower numerical apertures (e.g., NAs of 0.1 or less, of 0.08 or less, such as an NA of 0.06) and larger core diameters (core diameters of at least 15 microns, of at least 20 microns, such as a core diameter of 25 microns) can provide a fundamental mode having a larger mode field diameter (MFD), which can help defer the onset of detrimental non linear phenomena such as stimulated Brillouin scattering (SBS) or stimulated Raman scattering (SRS). According to the technique taught in the '301 patent, such fibers can often still be operated as a single mode fiber, which can preserve a good quality output beam, such as an output beam having a relatively low $M^2$ factor (e.g., an $M^2$ less than or equal to 5, less than or equal to 2.5, or less than or equal to 1.5). The output fiber 18 can often include such fibers.

Figure 4:
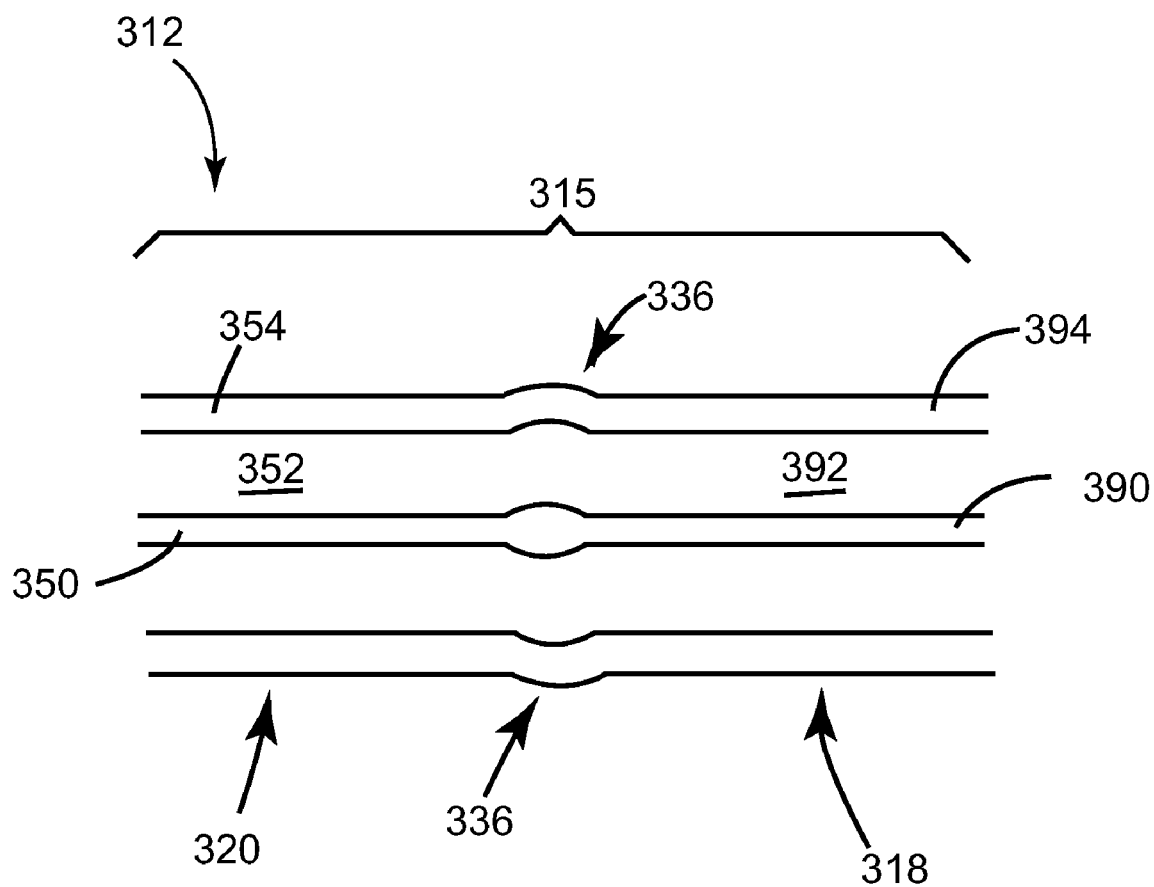
FIG. 4 schematically illustrates an additional embodiment of the invention.

As appreciated by one of ordinary skill in the art, the numerical aperture (NA) of a region of a fiber can often be related to the acceptance angle of light for that region of the fiber by the formula NA=sin $\theta_{max}$, where $\theta_{max}$ is the maximum angle of incidence for a ray that will be guided by the region. For at least a fiber having a first region having step refractive index profile relative to a second region cladding (e.g., the core relative to the cladding or first cladding relative to a second cladding) the NA can be calculated according to the aforementioned formula:

NA=[(refractive index of first region)$^2$−(refractive index of second region)$^2$]$^{1/2}$ FIG. 4 illustrates another example of an optical apparatus 312 according to the invention. The apparatus 312 can include an optical fiber 315 comprising a splice 336 joining the input optical fiber 320 to the output optical fiber 318. The input optical fiber can include the antiguiding core 350, a first cladding 352 disposed about the antiguiding core 350, and a second cladding 354, having an index of refraction that is less than an index of refraction of the first cladding 352, disposed about the first cladding 352. The output optical fiber 318 can include a guiding core 390, a first cladding 392 disposed about the guiding core 390, and a second cladding 394 disposed about the first cladding 392. The first cladding 392 can include an index of refraction that is less than an index of refraction of the guiding core 390, and the second cladding 394 can include an index of refraction that is less than index of refraction of the first cladding 392.

Figure 5:
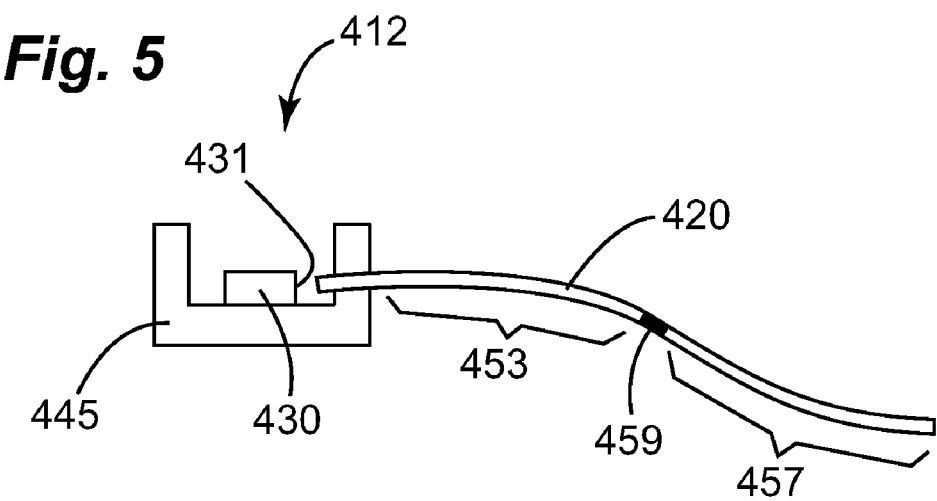
FIG. 5 schematically illustrates yet a further embodiment of the invention.

FIG. 5 illustrates another embodiment of the invention. The optical apparatus 412 includes a cladding pumped optical fiber 420 that can include an antiguiding core, a first cladding disposed about the core and a second cladding disposed about the first cladding so as to tend to confine light to the first cladding. The optical apparatus can include a pump light source 430 in optical communication with the cladding pumped optical fiber 420. For example, the pump light source can include a semiconductor laser diode having an output facet 431, where light emanating from the output facet 431 is launched into one end of the cladding pumped optical fiber 420. The optical apparatus 412 can include a package 445 for the pump light source 430, and at least a part of the cladding pumped fiber 420 can be secured with the package 445, such as by the fiber having a buffer or ferrule that is attached to the package 445. The pump light source 430 can comprise an optical fiber pigtail, which pigtail comprises the cladding pumped fiber 420. The pump light source 430 can be a single emitter diode having multiple transverse modes. "Optical fiber" or "fiber", as used herein, can include two fibers spliced or otherwise coupled together. The cladding pumped optical fiber 420 can include sections or lengths 453 and 457 coupled by splice 459.

Figure 6A:
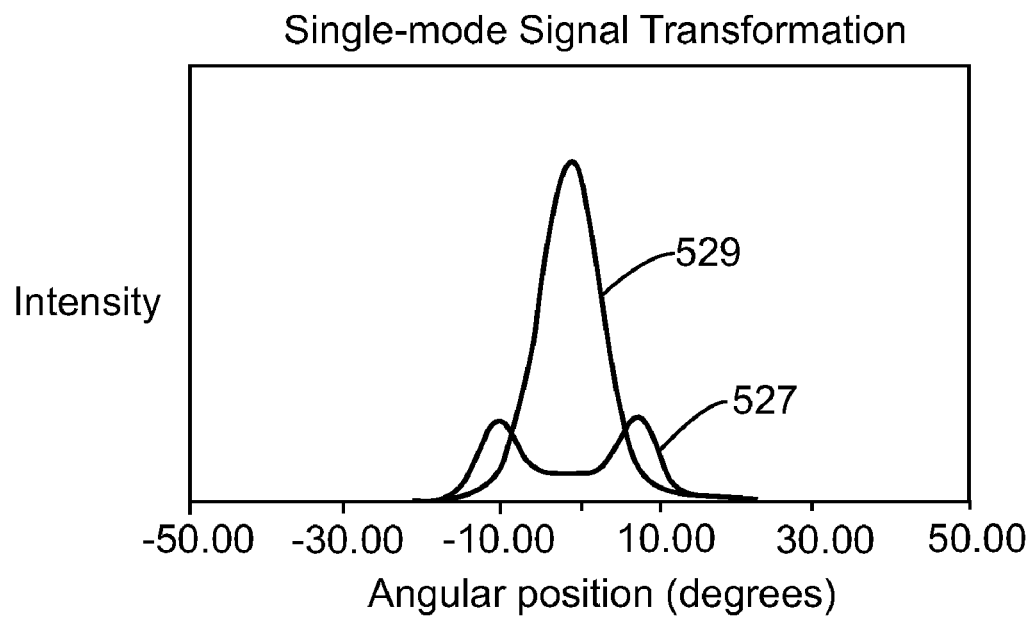
FIG. 6A illustrates measured far field output intensity profiles for a fiber according to the invention and a test fiber when single mode light is launched into each of the fibers.
Figure 6B:
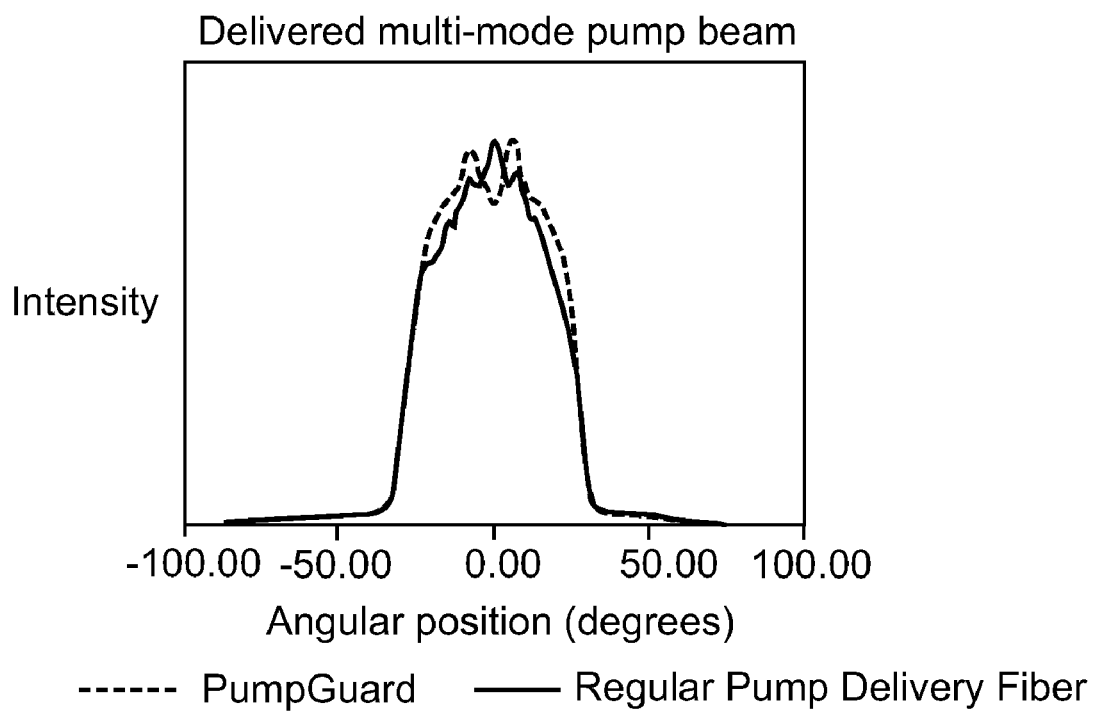
FIG. 6B illustrates far field output intensity profiles for the fibers of FIG. 6A when multimode light is launched into each of the fibers.

FIG. 6A illustrates measured far field intensity profiles for a first fiber having an antiguiding core according to the invention and a test fiber substantially similar to the first fiber except that it did not include an antiguiding core. The far field intensity profile 527 of the first fiber can be compared to the far field intensity profile 529 of the test fiber. The first fiber comprises an antiguiding core, a first cladding disposed about the antiguiding core and a second cladding disposed about the first cladding, where the second cladding is an optical cladding for tending to confine light to the first cladding. In generating each of the curves, single mode light was launched into one end of the fiber being measured by splicing the fiber to single mode fiber having a core having a diameter of 6 microns and a numerical aperture of about 0.18. The far field intensity profiles 527 and 529 were measured from the other end of the fiber being measured using a Photon, Inc. Model LD8900R/IR/10 Gonimetric Radiometer. The peak intensity of the far field intensity profile 527 certainly appears to be at least 25% or less of the peak intensity of the far field intensity profile 529. One of ordinary skill readily appreciates from a comparison of intensity profiles 527 and 529 that light tends to be excluded from the antiguiding core, which was centrally located in the first fiber. FIG. 6B illustrates far field output curves for the first and test fibers when the input light is from a multimode semiconductor source focused on the input end face of the fiber being measured. There is little or no difference between the curves, indicating that the antiguiding core has no significant detrimental effect on the propagation by the fiber of multimode light, such as may be provided by certain semiconductor pump light sources. The fibers had a length of 3 meters for the measurements of FIGS. 6A and 6B.

Several embodiments of the invention have been described and illustrated herein. Those of ordinary skill in the art will readily envision a variety of other means and structures for performing the functions and/or obtaining the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teachings of the present invention are used.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, $7^{th}$ Edition, Revision 1. Furthermore, statements in the specification, such as, for example, definitions, are understood to be open ended unless other wise explicitly limited.

Having described the invention, what is claimed as new and to be secured by Letters Patent is:

1. Optical apparatus, comprising:
    an optical fiber coupler including at least a first input optical fiber and at least one output optical fiber, said first input optical fiber comprising an antiguiding core, a first cladding disposed about said antiguiding core and a second cladding disposed about said first cladding so as to tend to confine light to said first cladding, said output optical fiber comprising a guiding core, a first cladding disposed about said guiding core and a second cladding disposed about said first cladding of said output optical fiber for tending to confine light to said first cladding of said output optical fiber, and
    wherein a length of said output optical fiber comprises at least one rare earth.
2. The optical apparatus of claim 1 wherein said apparatus has a wavelength of operation, and wherein said length of said output optical fiber is configured to be substantially single mode at said wavelength of operation, said rare earth for providing light having said wavelength of operation responsive to receiving pump light.
3. The optical apparatus of claim 2 wherein said length of output optical fiber normally supports higher order modes at said wavelength of operation and wherein said length being configured includes bending said length so as to attenuate higher order modes.
4. The optical apparatus of claim 1 wherein said guiding core comprises a diameter, and wherein said antiguiding core comprises a diameter that is at least equal to said diameter of guiding core.
5. The optical apparatus of claim 1 comprising a light source in optical communication with said first input optical fiber.
6. The optical apparatus of claim 1 wherein the material of said first cladding of said first input optical fiber consists essentially of silica.
7. The optical apparatus of claim 2 wherein said length of said output optical fiber normally supports higher order modes at said wavelength of operation.
8. The optical apparatus of claim 1 comprising a laser resonator.
9. Optical apparatus, comprising:
    an optical fiber coupler including at least a first input optical fiber and at least one output optical fiber, said first input optical fiber comprising an antiguiding core, a first cladding disposed about said antiguiding core and a second cladding disposed about said first cladding so as to tend to confine light to said first cladding, said output optical fiber comprising a guiding core, a first cladding disposed about said guiding core and a second cladding disposed about said first cladding of said output optical fiber for tending to confine light to said first cladding of said output optical fiber, and
    wherein said optical fiber coupler comprises a tapered fiber bundle.
10. The optical apparatus of claim 1 wherein said first input optical fiber is spliced to said output optical fiber.
11. The optical apparatus of claim 1 wherein said first input optical fiber supports a $LP_{01}$ mode that includes an intensity profile having a central minima.
12. The optical apparatus of claim 1 wherein said antiguiding core comprises an index of refraction that is less than an index of refraction of said first cladding of said first input optical fiber.
13. The optical apparatus of claim 12 wherein the index difference between said indices of refraction of said antiguiding core and said first cladding is about 0.0006.
14. The optical apparatus of claim 1 wherein substantially throughout said antiguiding core any index of refraction of said antiguiding core is less than an index of refraction of said first cladding of said first input optical fiber.
15. The optical apparatus of claim 1 wherein said first cladding of said first input optical fiber includes an outer perimeter and wherein at least a portion of said outer perimeter is curved.
16. The optical apparatus of claim 2 wherein said antiguiding core does not include a rare earth for providing light responsive to absorbing said pump light.
17. The optical apparatus of claim 1 wherein the material of said first cladding of said output optical fiber consists essentially of silica and where said first cladding of said output optical fiber comprises a numerical aperture relative to said second cladding of said output optical fiber of at least 0.2.
18. The optical apparatus of claim 1 wherein said first input optical fiber supports a lowest order LP mode having a cross sectional intensity distribution that includes an annular region of higher light intensity surrounding a region of lower light intensity.
19. Optical apparatus, comprising:
    an optical fiber coupler including at least a first input optical fiber and at least one output optical fiber, said first input optical fiber comprising an antiguiding core, a first cladding disposed about said antiguiding core and a second cladding disposed about said first cladding so as to tend to confine light to said first cladding, said output optical fiber comprising a guiding core, a first cladding disposed about said guiding core and a second cladding disposed about said first cladding of said output optical fiber for tending to confine light to said first cladding of said output optical fiber, and
    wherein said first input optical fiber comprises a longitudinally extending aperture defined by said first cladding, said antiguiding region comprising said aperture.
20. The optical apparatus of claim 19 wherein said aperture comprises air.

* * * * *